(12) United States Patent
Weissman et al.

(10) Patent No.: US 7,131,264 B2
(45) Date of Patent: Nov. 7, 2006

(54) METHOD OF OPERATING A REFORMER AND A VEHICLE

(75) Inventors: Jeffrey G. Weissman, Broken Arrow, OK (US); John E. Kirwan, Troy, MI (US); Michael J. Seino, Flushing, MI (US); Michael R. Salemi, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 432 days.

(21) Appl. No.: 10/353,304

(22) Filed: Jan. 29, 2003

(65) Prior Publication Data

US 2004/0146458 A1    Jul. 29, 2004

(51) Int. Cl.
*F01N 3/00*   (2006.01)
(52) U.S. Cl. ............ 60/286; 60/274; 60/301; 60/303; 48/197 R
(58) Field of Classification Search ........ 60/274, 60/284, 286, 289, 301, 303; 48/197 R
See application file for complete search history.

(56) References Cited

U.S. PATENT DOCUMENTS

| | | | | |
|---|---|---|---|---|
| 3,828,736 | A * | 8/1974 | Koch | 123/3 |
| 5,586,433 | A * | 12/1996 | Boegner et al. | 60/274 |
| 5,856,585 | A * | 1/1999 | Sanfilippo et al. | 568/470 |
| 6,176,078 | B1 * | 1/2001 | Balko et al. | 60/274 |
| 6,221,280 | B1 * | 4/2001 | Anumakonda et al. | 252/372 |
| 6,254,807 | B1 | 7/2001 | Schmidt et al. | |
| 6,348,278 | B1 * | 2/2002 | LaPierre et al. | 429/17 |
| 6,423,896 | B1 | 7/2002 | Keegan | |
| 6,464,947 | B1 | 10/2002 | Balland | |
| 6,481,641 | B1 | 11/2002 | Mieney | |
| 6,485,852 | B1 | 11/2002 | Miller et al. | |
| 6,502,533 | B1 | 1/2003 | Meacham | |
| 6,562,496 | B1 | 5/2003 | Faville et al. | |
| 6,562,502 | B1 | 5/2003 | Haltiner, Jr. | |
| 6,608,463 | B1 | 8/2003 | Kelly et al. | |
| 6,832,473 | B1 * | 12/2004 | Kupe et al. | 60/286 |
| 2002/0081253 | A1 | 6/2002 | Abe | |

OTHER PUBLICATIONS

Jung, H., et al.: "Fast start-up reactor for partial oxidation of methane with electrically-heated metallic monolith catalyst", Journal of Power Sources, Elsevier, Amsterdam, NL, vol. 124, No. 1, 01 Oct. 2003, XP004454595.
Leclerc C.A.; Rendenius J.M.; Schmidt L.D.: "Fast lightoff of millisecond reactors", Catalysis Letters, vol. 79, No. 1-4, Apr. 2002.
O'Connor R.P.; Klein E.J.; Schmidt L.D.; "High yields of synthesis gas by millisecond partial oxidation of high hydrocarbons" Catalysis Letters, Vol. 70, No. 3-4, Dec. 2000, pp. 99-107, XP002356937.
Kirwan J.E, et al.: Fast start-up on-board gasoline reformer for near zero emissions in spark-ignition engines, SAE Technical Paper Series, Society of Automotive Engineers, Warrendale, PA, US, Mar. 4, 2002, pp. 1-14, XP002903639.
Sadykov V.A., et al.: "Selective Oxifation of Hydrocarbons into Synthesis Gas at Short Contact Times: Design of Monolith Catalysts and Main Process Parameters", Kinetics and Catalysis, vol. 46, No. 2, Mar. 2005, pp. 227-250, XP009058068.

* cited by examiner

*Primary Examiner*—Binh Q. Tran
(74) *Attorney, Agent, or Firm*—Paul L. Marshall

(57) ABSTRACT

Disclosed herein are methods for operating a reformer and for operating a vehicle. In one embodiment, the method for operating the reformer comprises: introducing an oxidant and fuel to a reformer at greater than or equal to about 25,000/hr space velocity; combusting the oxidant and the fuel the reformer to produce a combustion gas, wherein the reformer comprises a reformer substrate comprising a reformer catalyst and having a thermal conductivity of greater than or equal to about 35 W/m° K; extinguishing the combustion; and introducing additional fuel and oxidant to the reformer at an air to fuel weight ratio appropriate for reforming. A method of using the reformate produced to reduce cold start emissions and/or regenerate an exhaust control device is also disclosed.

20 Claims, No Drawings

METHOD OF OPERATING A REFORMER AND A VEHICLE

BACKGROUND

Tighter emission standards and significant innovation in catalyst formulations and engine controls has led to dramatic improvements in the low emission performance and robustness of gasoline and diesel engine systems. However, many technical challenges remain to make the conventionally fueled internal combustion engine a nearly zero emission system having the efficiency necessary to make the vehicle commercially viable.

The automotive industry has made very significant progress in reducing automotive emissions in both the mandated test procedures and the "real world". This has resulted in some added cost and complexity of engine management systems, yet those costs are offset by other advantages of computer controls: increased power density, fuel efficiency, drivability, reliability and real-time diagnostics.

Future initiatives to require zero emission vehicles appear to be taking us into a new regulatory paradigm where asymptotically smaller environmental benefits come at a very large incremental cost. Yet, even an "ultra low emission" certified vehicle may emit high emissions in limited extreme ambient and operating conditions or with failed or degraded components, and especially during cold start.

One approach to addressing the issue of emissions is the employment of fuel cells, particularly solid oxide fuel cells ("SOFC"), in an automobile either as a primary or secondary source of power. A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. SOFCs are constructed entirely of solid-state materials, utilizing an ion conductive oxide ceramic as the electrolyte. An electrochemical cell in a SOFC may comprise an anode and a cathode with an electrolyte disposed there between. The oxidant passes over the oxygen electrode (cathode) while the fuel passes over the fuel electrode (anode), generating electricity, water, and heat. The use of the SOFC, and fuel cells in general, reduce emissions through their much greater efficiency, and so require less fuel for the same amount of power produced, as compared to conventional hydrocarbon fueled engines. Additionally, a fuel cell may be employed to supplement a conventional engine; in this way the engine may be optimized for primary traction power, while the fuel cell may provide other power needs for the vehicle, i.e. air-conditioner, communication and entertainment devices. Additionally, the fuel reformer—fuel cell system may be operated while the engine is off, permitting electrically powered devices to operate, and so further reducing emissions by providing power using a more fuel efficient fuel cell to meet the vehicle operator's needs.

To facilitate the production of electricity by the SOFC, a direct supply of simple fuel, e.g., hydrogen, carbon monoxide, and/or methane is preferred. However, concentrated supplies of these fuels are generally expensive and difficult to supply. Therefore, the fuel utilized may be obtained by processing a more complex fuel source. The actual fuel utilized in the system is chosen based upon the application, expense, availability, and environmental issues relating to the fuel. Possible fuels include hydrocarbon fuels, including, but not limited to, liquid fuels, such as gasoline, diesel fuel, ethanol, methanol, kerosene, and others; gaseous fuels, such as natural gas, propane, butane, and others; "alternative" fuels, such as biofuels, dimethyl ether, and others; synthetic fuels, such as synthetic fuels produced from methane, methanol, coal gasification or natural gas conversion to liquids, and combinations comprising at least one of the foregoing methods, and the like; as well as combinations comprising at least one of the foregoing fuels. The preferred fuel is based upon the types of equipment employed, with lighter fuels, i.e., those that may be more readily vaporized and/or conventional fuels, which are readily available to consumers being generally preferred.

Processing or reforming of hydrocarbon fuels, such as gasoline, may be completed to provide an immediate fuel source for rapid start up of the fuel cell as well as protecting the fuel cell by breaking down long chain hydrocarbons and by removing impurities. Fuel reforming may include mixing fuel with air, water and/or steam in a reforming zone before entering the reformer system, and converting a hydrocarbon (such as gasoline) or an oxygenated fuel (such as methanol) into hydrogen ($H_2$) and byproducts (e.g. carbon monoxide (CO), carbon dioxide ($CO_2$) methane ($CH_4$), inert materials (e.g., nitrogen ($N_2$), carbon dioxide ($CO_2$), and water ($H_2O$)). Approaches to reforming include steam reforming, partial oxidation, dry reforming, and combinations comprising at least one of the foregoing. Both steam reforming and dry reforming are endothermic processes, while partial oxidation is an exothermic process.

Accordingly, a SOFC may be used in conjunction with a fuel reformer to convert a hydrocarbon-based fuel to hydrogen and carbon monoxide (the reformate) usable by a fuel cell. Preferably, the reformer has a rapid start, a dynamic response time, and excellent fuel conversion efficiency. It is also preferred for the reformer to have a minimal size and reduced weight, as compared to other power sources. However, reformers operate at temperatures that may be greater than about 600° C., and may exceed about 1000° C. or more. At lower temperatures, for example during start-up, deposition of carbonaceous matter (or soot) upon the catalyst may adversely affect the reformer's efficiency, reduce reformer life, and/or damage fuel cell components. Accordingly, it is beneficial to reduce the time required by a reformer and/or fuel cell system to reach an operational temperature.

SUMMARY

Disclosed herein is a method for operating a reformer, comprising: introducing an oxidant and fuel to a reformer at greater than or equal to about 25,000/hr space velocity; combusting the oxidant and the fuel in the reformer to produce a combustion gas, wherein the reformer comprises a reformer substrate comprising a reformer catalyst and wherein the reformer substrate has a thermal conductivity of greater than or equal to about 35 W/m° K; passing the combustion gas through the reformer catalyst; extinguishing the combustion; and introducing additional fuel and oxidant to the reformer at an air to fuel weight ratio appropriate for reforming to produce a reformate.

Also disclosed is a method for operating a vehicle, comprising: introducing an oxidant and fuel to a reformer at greater than or equal to about 25,000/hr space velocity; combusting the oxidant and the fuel less than or equal to 10 cm upstream of a reformer catalyst to produce a combustion gas, wherein the reformer catalyst is disposed on a reformer substrate having a thermal conductivity of greater than or equal to about 35 W/m° K; extinguishing the combustion;

and introducing additional fuel and oxidant to the reformer at an air to fuel weight ratio appropriate for reforming.

Further disclosed is a method of reducing cold start exhaust gas emissions from an internal combustion engine, comprising: introducing an oxidant and fuel to a reformer at greater than or equal to about 25,000/hr space velocity; combusting the oxidant and the fuel less than or equal to 10 cm upstream of a reformer catalyst to produce a combustion gas, wherein the reformer catalyst is disposed on a reformer substrate having a thermal conductivity of greater than or equal to about 35 W/m° K; extinguishing the combustion; introducing additional fuel and oxidant to the reformer at an air to fuel weight ratio appropriate for reforming to produce a reformate; directing the reformate along with a source of oxygen into an internal combustion engine, an exhaust control device, or a combination comprising at least one of the foregoing; and combusting the reformate and source of oxygen for a period of time sufficient to increase a temperature of the internal combustion engine, the exhaust control device, or both.

Additionally disclosed is a method of regenerating an exhaust control device comprising: introducing an oxidant and fuel to a reformer at greater than or equal to about 25,000/hr space velocity; combusting the oxidant and the fuel less than or equal to 10 cm upstream of a reformer catalyst to produce a combustion gas, wherein the reformer catalyst is disposed on a reformer substrate having a thermal conductivity of greater than or equal to about 35 W/m° K; extinguishing the combustion; introducing additional fuel and oxidant to the reformer at an air to fuel weight ratio appropriate for reforming to produce a reformate; directing the reformate into the exhaust control device in and amount, at a temperature, and for a period of time sufficient to reduce an amount of a material being retained by the exhaust control device. The above described and other features are exemplified by the following detailed description.

DESCRIPTION OF THE PREFERRED EMBODIMENT

Of the various types of reformers available, the type of reformer technologies preferred depend in part on the type of fuel to be used. Steam reformer technology is generally employed for converting methanol to hydrogen. Partial oxidation reformers are generally employed for converting gasoline to hydrogen and carbon monoxide.

Steam reforming systems involve the use of a fuel and steam ($H_2O$) that is reacted in heated tubes filled with catalysts to convert the hydrocarbons into principally hydrogen and carbon monoxide. The steam reforming reactions are endothermic, thus the steam reformer reactors are designed to transfer heat into the catalytic process. An example of the steam reforming reaction is as follows:

$$CH_4 + H_2O \rightarrow CO + 3H_2$$

Partial oxidation reformers are based on substoichiometric combustion to achieve the temperatures necessary to reform the hydrocarbon fuel. Decomposition of the fuel to primarily hydrogen and carbon monoxide occurs through thermal reactions at high temperatures of about 600° C. to about 1,200° C., and preferably, about 700° C. to about 1,050° C. Catalysts have been used with partial oxidation systems (catalytic partial oxidation) to promote conversion of various low sulfur fuels into synthesis gas. The use of a catalyst may result in acceleration of the reforming reactions and may provide this effect at lower reaction temperatures than those that would otherwise be required in the absence of a catalyst. An example of the partial oxidation reforming reaction is as follows:

$$CH_4 + \tfrac{1}{2}O_2 \rightarrow CO + 2H_2$$

Dry reforming involves the creation of hydrogen and carbon monoxide in the absence of water, for example using carbon dioxide as the oxidant. Dry reforming reactions, like steam reforming reactions, are endothermic processes. An example of the dry reforming reaction is depicted in the following reaction:

$$CH_4 + CO_2 \rightarrow 2CO + 2H_2$$

Practical reformer systems may include a combination of these idealized processes. Thus, a combination of air, water and/or recycled engine exhaust gas may be used as the oxidant in the fuel reforming process.

The reformer catalyst substrate suitable for use herein may comprise any material designed for use in an fuel reforming environment and having the following characteristics: (1) capable of operating at temperatures of at least about 1,000° C., more preferably at greater than or equal to about 1200° C.; (2) capable of withstanding reducing and oxidizing environments containing, for example, hydrocarbons, hydrogen, carbon monoxide, water, oxygen, sulfur and sulfur compounds, combustion radicals such as H+, OH—, and the like, and carbon particulate matter; (3) having sufficient surface area and structural integrity to support the desired catalyst; and preferably (4) having a high thermal conductivity, i.e., greater than or equal to about 35 watts per meter degree Kelvin (W/m° K).

The use of ceramic catalyst substrates is widespread, especially in applications such as automotive exhaust catalysts and fuel partial oxidation, autothermal reforming, or steam reforming, water-gas shift reactions, and the like. Substrates used in the art are almost exclusively composed of cordierite and/or compositions having similar properties, which contain one or more oxides of magnesium, aluminum, and silicon. Due to low thermal conductivity of such ceramic substrates however, there may be a significant difference in substrate temperature as measured in the radial direction, perpendicular to the direction of fluid flow of the reactant gas through the catalytic substrate. This radial temperature differential may be exasperated (i.e., increased) by higher flow rates through the catalyst.

Issues arising from the existence of such a radial temperature differential include uneven rates of reaction in conversion of the starting materials to the end products. In the case of fuel partial oxidation, for example, the interior of the catalyst substrate may be hotter than portions nearer the outer radius of the substrate. This is especially significant during the first several seconds of reformer operation from cold start. Accordingly, reactant conversion rates may vary as a function of radial position on the substrate. This may also lead to excessive heat generation in the radial center that may result in damage to the catalyst and/or the substrate. Also, to insure that all reactants are converted, the catalyst length may also need to be extended to compensate for the cooler portions of the substrate.

In the case of a steam reforming system, a similar situation may arise. In this case however, the radial outermost portion of the catalyst is hotter due to external heating required to promote this endothermic reaction, while the center is cooler, again resulting in lowered conversion, but in this case the reactants nearest the radial center of the catalyst exhibit lowered conversion rates.

It has been discovered that use of a substrate having high thermal conductivity may mitigate the effects of a radial temperature gradient. For example, by using a substrate having a high thermal conductivity, heat is more effectively conducted away from the center of the catalyst such that a larger volume of the catalyst is at a temperature effective in converting reactants.

In addition, it has been unexpectedly discovered that a substrate having high thermal conductivity provides for faster light-off time of the catalyst as compared to materials having lower thermal conductivity. In fact, the use of high thermal conductivity materials in combination with external heating through combustion and other processes has been found to provide for an extremely fast light-off time (i.e., able to produce reformate containing more than 10 mol % $H_2$, based upon a total amount of moles in the reformate, in less than or equal to about 30 seconds). Reformers that do not employ high thermal conductivity substrates and the process disclosed herein have times to attain light-off temperature of about 5 to about 10 minutes, and may be as long as several hours, depending on the system configuration and catalyst heating methods employed.

Currently employed reforming devices use insulating substrates such as cordierite, alumina, or zirconia-toughened alumina (ZTA). Gasoline reforming light-off, which is defined herein as the observation of greater than or equal to about 50% conversion of gasoline and oxidant to CO and $H_2$ products, requires a catalyst temperature of about 400° C. to about 500° C. The substrate may be externally heated to this light-off temperature in a variety of ways including external heating (e.g., electrical resistive heating, heating through the reformer wall, and the like). In these cases, substrates with low thermal conductivity were preferred because of their ability to retain heat. This heat retention was thought to lead to a decreased light-off time, as the heat retention ability of the low-thermal conductivity substrate was seen as a benefit.

However, it has been discovered that use of a substrate comprising a high thermally conductive material in combination with external heating of the substrate provides for improved light-off times. In one embodiment, air and fuel are mixed together in stoichiometric proportions (e.g., an air to fuel (A/F) weight ratio of about 13.5/1 to about 15/1) and spark ignited to produce a combustion gas at or near a face of a reformer catalyst (e.g., preferably less than or equal to about 10 centimeters (cm) from the reformer catalyst, with a distance of less than or equal to about 5 cm from the reformer catalyst more preferred, and a distance of less than or equal to about 2.5 cm from the reformer catalyst even more preferred) comprising a reformer catalyst disposed on a reformer substrate (preferably a high thermal conductivity substrate).

The combustion gas is then directed through the reformer, preferably at a high flow rate (e.g., greater than or equal to about 25,000/hr space velocity; preferably, the flow rate is greater than or equal to about 100,000/hr space velocity, with about 150,000/hr to about 200,000/hr space velocity more preferred) for a short period of time (e.g., less than about 10 seconds; preferably the period of time is less than about 3 seconds, with less than or equal to about 1 second more preferred, about 0.25 to about 1 second being especially preferred).

Fuel flow is then paused for a sufficient period of time to extinguish the combustion (e.g., for a second period of time less than or equal to about 10 seconds, with less than or equal to about 3 second preferred, and less than or equal to about 1 second more preferred). Once the combustion (e.g., flame) has been extinguished, the fuel flow is resumed at an A/F weight ratio appropriate for reforming (e.g., at a syn-gas ratio; this ratio is an A/F weight ratio of about 4.5/1 to about 6.5/1, with about 5.0/1 to about 6.0/1 generally preferred).

The catalyst on the substrate immediately lights-off for the reforming reaction, resulting in the observation of significant hydrogen production, such as in excess of 15 mole percent (mol %), within less than or equal to about 30 seconds, in less than or equal to about 20 seconds, with less than or equal to 10 seconds may be attained, and less than or equal to about 5 seconds possible.

In summary, in order to attain a fast light-off in less than or equal to about 30 seconds, combustion gases, fuel and oxidant (e.g., air or the like), are introduced at a combustion A/F weight ratio and at a high flow rate to a reformer comprising an ignition source (e.g., a spark plug or the like). Within the reformer, the combustion gases are ignited and passed through the reformer catalyst. After a short period of time, the combustion is stopped. After the combustion is extinguished, fuel is introduced to the reformer at an A/F weight ratio appropriate for reforming. Due to this method and the use of a high thermal conductivity substrate for the reformer catalyst, light off may be attained in less than or equal to about 10 seconds.

Accordingly, it has been discovered that substrates with high thermal conductivity permit shorter light-off times than substrates with lower thermal conductivity, which is counter to the expectation that a low thermal conductivity substrate would retain significant heat on the front face heated portion, and so permit rapid light-off. Not intending to be bound by theory, it is believed that substrates with higher thermal conductivity not only retain sufficient heat on the front face, but also transfer more heat throughout the volume of the substrate than do low thermal conductivity substrates (e.g., substrates having a thermal conductivity of less than or equal to about 27 W/m° K. In doing so, a greater volume of catalyst is immediately available for the reforming reaction. The greater extent of reaction obtained, being exothermic, further heats a greater volume of substrate when compared to one of lower thermal conductivity, and accelerates the transition from low temperature oxidation reactions (i.e., formation of $CO_2$ and $H_2O$) to a light-off condition wherein the desired high temperature partial oxidation reactions occur (i.e., formation of $H_2$ and CO).

For use herein, a high thermal conductivity substrate has a thermal conductivity of greater than or equal to about 35 W/m° K. A thermal conductivity of greater than or equal to about 40 W/m° K is more preferred, with greater than or equal to about 45 W/m° K even more preferred.

Examples of high thermally conductive materials suitable for use herein include those comprising carbides such as silicon carbide (SiC), carbides of molybdenum, carbides of tungsten, suicides, nitrides such as $Si_3N_4$, nitrides of molybdenum, nitrides of tungsten, high density and/or highly conductive forms of carbon including diamond and the like, metals such as stainless steel, aluminum, and the like, as well as oxides, alloys, cermets and mixtures comprising at least one of the foregoing materials.

High thermally conductive substrates may have any size or geometry. The size and geometry are preferably chosen to optimize the surface area in the given catalytic reformer design parameters. The reformer catalyst substrate may have an open cell foam structure, or an extruded honeycomb cell geometry, with the cells being any multi-sided or rounded shape, with substantially square, hexagonal, octagonal or similar geometries preferred due to increased surface area and structural integrity. The reformer catalyst substrate may be formed into a cell structure with a plurality of cells arranged in a honeycomb pattern using a foam process, and the like.

A catalyst may also be disposed on and/or throughout the reformer catalyst substrate. The catalyst may also be carried on and/or disposed within a support material. The catalyst may comprise one or more catalyst materials that are wash coated, imbibed, impregnated, physisorbed, chemisorbed, precipitated, or otherwise applied to the catalyst substrate. Possible catalyst materials include metals, such as platinum, palladium, rhodium, iridium, osmium, ruthenium, tantalum, zirconium, yttrium, cerium, iron, nickel, copper, and the like, and oxides, mixtures, and alloys comprising at least one of the foregoing metals, and other catalysts, with platinum, palladium, rhodium, ruthenium, and oxides, mixtures, and alloys comprising at least one of the foregoing metals preferred.

The support material, if used, may be disposed onto or in the substrate before addition of the catalyst, or placed onto or in the substrate together with the catalyst in one or more operations. Support materials may include oxides of aluminum, silicon, zirconium, titanium, vanadium, niobium, and mixtures comprising at least one of the foregoing. Additional materials such as those comprising cerium, lanthanum, yttrium, phosphorous, molybdenum oxides, barium, potassium, sodium, cesium, magnesium, calcium or combinations comprising at least one of the foregoing. Carbides, silicides, and nitrides, of elements such as silicon, molybdenum, nitrogen, tungsten, and the like, may also be useful as supports. These supports may be wash coated, sprayed, vapor deposited, plasma deposited, electrochemically deposited, and/or disposed by other means onto or within the substrate.

Experimentally, the effect of a substrate having a higher thermal conductivity, as compared to low thermal conductivity substrates such as cordierite, may be observed in various ways. For example, the measured radial-centered back face temperature of a high thermally conductive substrate decreases, indicating that heat is being transferred more effectively from the hot center to the cooler walls; and concentration of $H_2$ and CO in the product gas (at the same reactant flow rates) is seen to increase, indicating that the catalyst is more effective at converting reactants to products, due to more evenly distributed temperatures throughout the catalyst. (Percentages are mole percentages and are based upon the total moles of the gas exiting the reformer.) See for example this data summarized in the Examples and in Data Table 1 below.

The use of reformers having a fast light-off time extends to other applications in addition to use with a fuel cell. One such use includes reducing emissions from conventional engine equipped vehicles by reduction of cold-start emissions.

Modern engines and engine exhaust treatment devices are extremely efficient after continuous operation for some period of time; however, they may prove to be ineffective at controlling emissions during the first few moments of operation, due in part to the time needed for exhaust treatment devices to reach some minimum operating temperature. Injection of highly combustible reactants into either the engine or the exhaust treatment device, or both, may significantly reduce the time required for these devices to reach operating temperatures. It has been discovered that a fuel reformer capable of an extremely fast light off as disclosed herein may produce highly combustible reformate effluent, i.e. hydrogen and carbon monoxide, in a quantity sufficient to cause rapid heating of the engine or exhaust treatment device, or both, via injection of the reformate and possibly additional air into these devices, thus causing the reformate to combust. Accordingly, injection of reformate into an engine or exhaust treatment device in a very short time from cold start (within 30 seconds, ideally less than 5 seconds) may nearly eliminate cold-start exhaust as a source of vehicle emissions.

Commonly assigned, co-pending U.S. patent application Ser. No. 10/411,265 of Kirwan et al., entitled "System And Controls For Near Zero Cold Start Tailpipe Emissions In Internal Combustion Engines," which is hereby incorporated by reference in its entirety, discloses an on-board fuel reformer-engine system employing substantially 100% reformate fueling at start-up for near-zero cold start hydrocarbon and NOx engine emissions.

Commonly assigned, co-pending U.S. patent application Ser. No. 10/229,729 of Kirwan et al., a continuation-in-part of the above referenced application, entitled "Method for Starting A Fast Light-Off Catalytic Fuel Reformer," which is hereby incorporated by reference in its entirety, discloses a fast light-off catalytic reformer and method for rapid production of reformate for hydrogen cold start in an internal combustion engine; and most particularly, to a method for quenching a start-up combustion reaction in the reformer prior to initiating reforming of fuel.

The use of a high thermal conductivity substrate as disclosed herein has unexpectedly been found to improve the performance of these devices and methods, resulting in more desirable features. In particular, improvements extend to applications directed to the treatment of exhaust from diesel-fuel engines, and for use in the operation of devices designed to reduce emissions from diesel-fuel engines.

Diesel-engine exhaust treatment devices may include a particulate trap, a nitrogen oxide trap, a sulfur trap, a catalytic combustor, or devices employing several of these functionalities simultaneously. The various traps operate at relatively high temperatures, and collect material, i.e. particulates, nitrogen oxides, or sulfur bearing compounds removed from an exhaust gas. A fast-start reformer may be used to decrease the time required for the diesel engine and the exhaust treatment devices, traps and/or converters to reach operating temperature via injection of reformate and optional additional air during the first few seconds of device operation.

To function efficiently, the traps and other devices periodically need to be regenerated (e.g., cleaned out). The time between regeneration may vary from less than one minute, to 20 minutes or more depending on the size of trap, the size of engine, the trap efficiency, and so on. Current technology includes methods of exhaust trap regeneration such as injection of solutions of urea, injection of ammonia, or injection of other reactants into the trap for the purpose of chemically removing the collected material. While these methods are effective, they may significantly increase operational complexity due to the need to have on-board storage of urea solutions, ammonia and the like, with additional controls, vessels, tubing, and infra-structure requirements for replenishment.

It has been discovered that a fast-start fuel reformer employing diesel fuel may be used to eliminate most of this added complexity while retaining the beneficial functionality of trap regeneration. In doing so, reformate comprising hydrogen, carbon monoxide and the like is produced in the reformer and directed into the exhaust treatment device in a quantity sufficient to regenerate the device by causing the trapped material to be chemically removed or rendered innocuous. As such, the fuel reformer will be operated periodically, and for a sufficient time to regenerate the traps and other exhaust treatment devices.

Anticipated is reformer operation of about 1% to about 50% of the total time, base on the total operating time of a trapping device. Within this range, a reformer operation time of less than or equal to about 20% may be employed, with less than or equal to about 10% preferred. Also preferred within this range is a reformer operating time of greater than or equal to about 2%, with greater than or equal to about 5% of the total operating time of the device being especially preferred.

Also anticipated is a reformer in operation about 1 to about 600 seconds during each regeneration cycle of a trap or other exhaust control device. Within this range, a reformer operation time of less than or equal to about 120 seconds may be employed, with less than or equal to about 30 seconds preferred. Also preferred within this range is a reformer operating time of greater than or equal to about 5 seconds, with greater than or equal to about 10 seconds especially preferred.

Another embodiment includes a method for operating a vehicle comprising: introducing an oxidant and fuel to a reformer at greater than or equal to about 150,000/hr space velocity; combusting the oxidant and the fuel less than or equal to 10 cm upstream of a reformer catalyst to produce a combustion gas, wherein the reformer catalyst is disposed on a reformer substrate having a thermal conductivity of greater than or equal to about 35 W/m° K; extinguishing the combustion; and introducing additional fuel and oxidant to the reformer at an air to fuel weight ratio appropriate for reforming, with the gaseous product of the reformer being introduced into an internal combustion engine, the exhaust catalyst, various traps, or combinations comprising at least one of the foregoing, and thus mitigating the deleterious effects of cold-start on exhaust emissions. Also included is an additional periodic operation of the reformer in order to provide chemical reactants for removal of trapped material from various exhaust traps employed therein.

Other equipment which may be employed with the above disclosed systems includes, but is not limited to, heat exchanger(s), compressor(s), exhaust emissions control device(s) (e.g., a plasma reactor, a catalytic converter, a cracking catalyst unit, and the like), preheating device(s), traction devices such as internal or external combustion engines and turbines for stationary or mobile applications, plasmatron(s), electrical source(s) (e.g., battery, capacitor, motor/generator, turbine, and the like, as well as combinations comprising at least one of the foregoing electrical sources), and connections, wiring, control valves, and a multiplicity of electrical loads, including, but not limited to, lights, resistive heaters, blowers, air conditioning compressors, starter motors, traction motors, computer systems, radio/stereo systems, and a multiplicity of sensors and actuators, and the like, as well as other components.

Accordingly, provided for herein is a method of operating a fuel reformer so as to minimize the time required to reach operating temperature through judicious choice of fuel reforming catalyst substrates. An added benefit of this fast-light off capability includes the use of the heat generated by the fuel reformer to rapidly heat the fuel cell to an operating temperature. Another benefit provided for herein is a fuel reformer capable of a fast light off obtained through judicious choice of a fuel reforming catalyst substrate, and a method of using such a reformer to produce a reformate comprising chemical reactants, e.g., hydrogen and carbon monoxide, in a quantity sufficient to regenerate an exhaust treatment device such as a particulate filter, a nitrogen oxide trap, a sulfur trap, or various combinations thereof. This reformate, when directed into an exhaust treatment device, causes the trapped or retained material to be chemically removed from the device. Included in this method is a periodic operation of the fuel reformer device for sufficient time and under a set of conditions (e.g., concentration and temperature) so as to produce a type and quantity of reformate sufficient to regenerate a filter and/or trap. The above-described applications, and other features are exemplified by the following non-limiting examples.

EXAMPLES

This example includes a demonstration of the advantages of using a high thermal conductivity substrate in a fuel reformer. In all tests the catalyst was 2 weight percent (wt %) rhodium on an alumina support, loaded to 30 grams of rhodium per cubic foot onto the substrate. The tests were conducted using CARB Phase II gasoline (oxygenated, no additives) and air, at a total space velocity of about 45,000/hr (measured at 0° C., 1 atmosphere (atm)), with molar oxygen to carbon (O/C) ratio of about 1.05. The values presented are averaged over the first 1,000 minutes of testing and the ranges reported in the thermal conductivity values are due to morphological differences that occur in the materials tested. All substrates are 20 ppi except SiC, which is 30 ppi. Substrate sizes are 1-inch outer diameter by 1 inch long.

DATA TABLE 1

| | Substrate | Thermal Conductivity (W/m° K.) | Average catalyst back face Temperature (° C.) | Average $H_2$ Concentration in product (%) | Average CO Concentration in product (%) |
|---|---|---|---|---|---|
| Comparative Example 1 | Cordierite foam | 2 | 1048 | 20.0 | 22.9 |
| Comparative Example 2 | FSZM foam | 2.2 | 1041 | 19.2 | 22.4 |
| Comparative Example 3 | ZTA foam | 18 | 1012 | 20.0 | 23.0 |
| Example 4 | SiC foam | 40–150 | 952 | 22.0 | 23.9 |

As the data shows, Examples 3 and 4 having catalyst substrates with relatively high thermal conductivity as compared to cordierite foam (Comparative Example 1) and FSZM foam (Comparative Example 2), show a lower average back face temperature (i.e., more uniform and efficient distribution of thermal energy) along with a higher concentration of products (e.g., $H_2$ and CO in the product stream).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for operating a reformer, comprising:
introducing an oxidant and fuel to a reformer at greater than or equal to about 25,000/hr space velocity;
combusting the oxidant and the fuel in the reformer to produce a combustion gas, wherein the reformer comprises a reformer substrate comprising a reformer catalyst and wherein the reformer substrate has a thermal conductivity of greater than or equal to about 35 W/m° K;
passing the combustion gas through the reformer catalyst;
extinguishing the combustion; and
introducing additional fuel and oxidant to the reformer at an air to fuel weight ratio appropriate for reforming to produce a reformate.

2. The method of claim 1, wherein the reformer catalyst attains a light-off temperature in less than or equal to about 30 seconds as measured from the time at which the reformer catalyst was contacted with the combustion gas.

3. The method of claim 1, wherein the reformer catalyst comprises platinum, palladium, rhodium, iridium, osmium, ruthenium, tantalum, zirconium, yttrium, cerium, nickel, copper, iron, or a combination comprising at least one of the foregoing.

4. The method of claim 1, wherein the reformer further comprises a reformer support, wherein the support comprises oxides of alumina, silica, titanium, zirconium, or a combination comprising at least one of the foregoing.

5. The method of claim 1, wherein the reformer further comprises a reformer support, wherein the support comprises a nitride of silicon, a nitride of molybdenum, a nitride of tungsten, a silicide, a carbide of silicon, a carbide of molybdenum, a carbide of tungsten, or a combination comprising at least one of the foregoing.

6. The method of claim 5, wherein the reformer substrate comprises silicon carbide.

7. The method of claim 1, wherein the space velocity is to about 100,000/hr to about 200,000/hr.

8. The method of claim 1, wherein the reformer catalyst is contacted with the combustion gas for a first period of time sufficient to increase the temperature of the reformer catalyst such that a reformate having greater than or equal to about 15 mol% hydrogen, based upon a total amount of moles in the reformate, may be produced in less than or equal to about 30 seconds as measured from the time at which the reformer catalyst was contacted with the combustion gas.

9. The method of claim 1, wherein extinguishing combustion further comprises ceasing the flow of fuel for less than or equal to about 3 seconds.

10. The method of claim 1, wherein the thermal conductivity of the reformer substrate is greater than or equal to about 40 W/m° K.

11. The method of claim 1, wherein the fuel is suitable for use in a diesel engine.

12. The method of claim 1, further comprising directing the reformate along with a source of oxygen into an internal combustion engine, an exhaust control device, or a combination comprising at least one of the foregoing; and
combusting the reformate and source of oxygen for a period of time sufficient to increase a temperature of the internal combustion engine, the exhaust control device, or both.

13. The method of claim 12, wherein the internal combustion engine is a diesel engine.

14. The method of claim 12, wherein the exhaust control device is a particulate trap, a nitrogen oxide trap, a sulfur trap, a catalytic combustor, a catalytic converter, or a combination comprising at least one of the foregoing exhaust control devices.

15. The method of claim 12, further comprising directing the reformate into an exhaust control device in operation within an exhaust gas system in a quantity, at a temperature, and for a period of time sufficient to remove a portion of a material retained by the exhaust control device.

16. The method of claim 15, wherein the reformate is periodically directed into the exhaust control device for less than or equal to about 50% of a time in which the exhaust control device is in operation within an exhaust gas system.

17. The method of claim 15, wherein the reformate is periodically directed into the exhaust control device for less than or equal to about 600 seconds of time during a period in which the exhaust control device is functioning within an exhaust gas system, followed by a period of time wherein the reformate is not directed into the exhaust control device functioning within an exhaust gas system.

18. A method for operating a vehicle, comprising:
introducing an oxidant and fuel to a reformer at greater than or equal to about 25,000/hr space velocity;
combusting the oxidant and the fuel less than or equal to 10 cm upstream of a reformer catalyst to produce a combustion gas, wherein the reformer catalyst is disposed on a reformer substrate having a thermal conductivity of greater than or equal to about 35 W/m° K;
extinguishing the combustion; and
introducing additional fuel and oxidant to the reformer at an air to fuel weight ratio appropriate for reforming.

19. A method of reducing cold start exhaust gas emissions from and internal combustion engine, comprising:
introducing an oxidant and fuel to a reformer at greater than or equal to about 25,000/hr space velocity;
combusting the oxidant and the fuel less than or equal to 10 cm upstream of a reformer catalyst to produce a combustion gas, wherein the reformer catalyst is disposed on a reformer substrate having a thermal conductivity of greater than or equal to about 35 W/m° K;
extinguishing the combustion;
introducing additional fuel and oxidant to the reformer at an air to fuel weight ratio appropriate for reforming to produce a reformate;
directing the reformate along with a source of oxygen into an internal combustion engine, an exhaust control device, or a combination comprising at least one of the foregoing; and
combusting the reformate and source of oxygen for a period of time sufficient to increase a temperature of the internal combustion engine, the exhaust control device, or both.

20. A method of regenerating an exhaust control device comprising:

introducing an oxidant and fuel to a reformer at greater than or equal to about 25,000/hr space velocity;

combusting the oxidant and the fuel less than or equal to 10 cm upstream of a reformer catalyst to produce a combustion gas, wherein the reformer catalyst is disposed on a reformer substrate having a thermal conductivity of greater than or equal to about 35 W/m° K;

extinguishing the combustion;

introducing additional fuel and oxidant to the reformer at an air to fuel weight ratio appropriate for reforming to produce a reformate;

directing the reformate into the exhaust control device in and amount, at a temperature, and for a period of time sufficient to reduce an amount of material being retained by the exhaust control device.

* * * * *